(12) United States Patent
Amadeu

(10) Patent No.: US 8,738,943 B2
(45) Date of Patent: May 27, 2014

(54) CONTROLLING AND MINIMIZING ELECTRICAL POWER CONSUMED BY ELECTRICAL COMPONENTS CONNECTED TO A NETWORKED COMPUTING ENVIRONMENT

(75) Inventor: Ariane Hernandes Amadeu, Nova Odessa (BR)

(73) Assignee: International Business Machines Corporation, Armonk, NY (US)

(*) Notice: Subject to any disclaimer, the term of this patent is extended or adjusted under 35 U.S.C. 154(b) by 475 days.

(21) Appl. No.: 13/052,754

(22) Filed: Mar. 21, 2011

(65) Prior Publication Data

US 2012/0246497 A1 Sep. 27, 2012

(51) Int. Cl.
G06F 1/26 (2006.01)

(52) U.S. Cl.
USPC ............................. 713/310; 713/300; 713/320

(58) Field of Classification Search
USPC .......................................... 713/300, 310, 320
See application file for complete search history.

(56) References Cited

U.S. PATENT DOCUMENTS

| | | | |
|---|---|---|---|
| 6,297,746 B1 * | 10/2001 | Nakazawa et al. ........... | 340/12.5 |
| 6,457,132 B1 * | 9/2002 | Borgendale et al. ......... | 713/320 |
| 6,766,223 B1 * | 7/2004 | Motoyama .................... | 700/286 |
| 7,249,269 B1 * | 7/2007 | Motoyama .................... | 713/320 |
| 7,480,534 B2 | 1/2009 | Bray et al. | |
| 7,619,366 B2 | 11/2009 | Diederiks | |
| 2002/0178387 A1 * | 11/2002 | Theron .......................... | 713/300 |
| 2003/0217150 A1 * | 11/2003 | Roese et al. .................. | 709/225 |
| 2007/0240002 A1 * | 10/2007 | Motoyama .................... | 713/320 |
| 2007/0268130 A1 | 11/2007 | Yee et al. | |
| 2008/0183316 A1 | 7/2008 | Clayton | |
| 2009/0217065 A1 * | 8/2009 | Araujo, Jr. .................... | 713/320 |
| 2009/0274070 A1 * | 11/2009 | Mukherjee et al. ........... | 370/257 |
| 2010/0001652 A1 | 1/2010 | Damsleth | |
| 2010/0063641 A1 | 3/2010 | Scholten | |
| 2010/0077241 A1 * | 3/2010 | Piazza et al. .................. | 713/320 |
| 2011/0296213 A1 * | 12/2011 | Ferlitsch et al. .............. | 713/320 |
| 2012/0159156 A1 * | 6/2012 | Barham et al. ................ | 713/156 |

OTHER PUBLICATIONS

Celesc. "Consumption Simulator." ProCELeficiencia. 2011. Date URL last accessed Mar. 2, 2011 <http://proceleficiencia.celesc.com.br/index.php?novasessao=14>.

Oliver, N. et al. "Layered representations for learning and inferring office activity from multiple sensory channels." Elsevier Inc. Computer Vision and Image Understanding, vol. 96, Issue 2, pp. 163-180, 2004.

* cited by examiner

Primary Examiner — Paul Yanchus, III
Assistant Examiner — Zahid Choudhury
(74) Attorney, Agent, or Firm — Samad A. Adediran; Daniel R. Simek

(57) ABSTRACT

Embodiments of the present invention provide an approach for controlling and minimizing electrical power consumption of a plurality of lights and electronic devices connected to a networked computing environment, wherein asset and space management software can be utilized to monitor and remotely turn off the electronic devices that are determined as not being utilized, based on observed indicators of inactivity associated with the electronic devices. Specifically, the location of the electronic devices are determined and then registered and stored in a database, wherein the electronic devices include desktop computers, laptops, phones, and heating ventilation and air conditioning (HVAC) systems that are connected to the networked computing environment.

15 Claims, 3 Drawing Sheets

US 8,738,943 B2

CONTROLLING AND MINIMIZING ELECTRICAL POWER CONSUMED BY ELECTRICAL COMPONENTS CONNECTED TO A NETWORKED COMPUTING ENVIRONMENT

TECHNICAL FIELD

The present invention generally relates to controlling and minimizing electrical power consumption. Specifically, the present invention relates to controlling and minimizing the electrical power consumption of electrical components connected to a networked computing environment.

BACKGROUND

Electrical components such as lights, electronic devices, and heating ventilation and air conditioning (HVAC) systems are often not connected to a networked computing environment, which causes difficulty in effectively monitoring and controlling electrical power consumption. Moreover, electrical components that are not connected to a networked computing environment are frequently left on throughout businesses during all hours of the day, and seven days a week even though they are not being productively utilized for extended periods of time. For example, in office buildings, electrical power is wasted by monitors, desktop computers, laptop computers, and HVAC systems that are not being utilized and are left on long after the workday has ended. The electrical power wasted causes an increase in business operating costs and places undue strain on electrical grids. In addition, consumers may not obtain the maximum benefit of the lights, electronic devices, and HVAC systems when electrical power is wasted because lights, electronic devices, and HVAC systems have an estimated useful life that decreases as they consume power.

SUMMARY

Embodiments of the present invention are directed to controlling and minimizing electrical power consumption of lights, electronic devices, and heating ventilation and air conditioning (HVAC) systems by monitoring electronic devices connected to a networked computing environment.

A first aspect of the present invention provides a computer implemented method for controlling and minimizing electrical power consumption of electrical components connected to a networked computing environment, the method comprising the steps of: determining location information of the electrical components connected to the networked computing environment; monitoring the electrical components to identify indicators of inactivity; generating information on the indicators of inactivity for the electrical components connected to the networked computing environment; storing the location information and information on indicators of inactivity on an electronic storage device; determining whether the electrical components are not being utilized based on the indicators of inactivity; and turning on or off the electrical components based on the indicators of inactivity.

A second aspect of the present invention provides a system for controlling and minimizing electrical power consumption of electrical components connected to a networked computing environment, the system comprising: a bus; a processor coupled to the bus; a memory medium coupled to the bus, the memory medium comprising instructions to: determine location information of the electrical components connected to the networked computing environment; monitor the electrical components to identify indicators of inactivity; generate information on the indicators of inactivity for the electrical components connected to the networked computing environment; store the location information and information on indicators of inactivity on an electronic storage device; determine whether the electrical components are not being utilized based on the indicators of inactivity; and turn on or off the electrical components based on the indicators of inactivity.

A third aspect of the present invention provides a computer program product for controlling and minimizing electrical power consumption of electrical components connected to a networked computing environment, the computer program product comprising a computer readable storage media, and program instructions stored on the computer readable storage media, to: determine location information of the electrical components connected to the networked computing environment; monitor the electrical components to identify indicators of inactivity; generate information on the indicators of inactivity for the electrical components connected to the networked computing environment; store the location information and information on indicators of inactivity on an electronic storage device; determine whether the electrical components are not being utilized based on the indicators of inactivity; and turn on or off the electrical components based on the indicators of inactivity.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
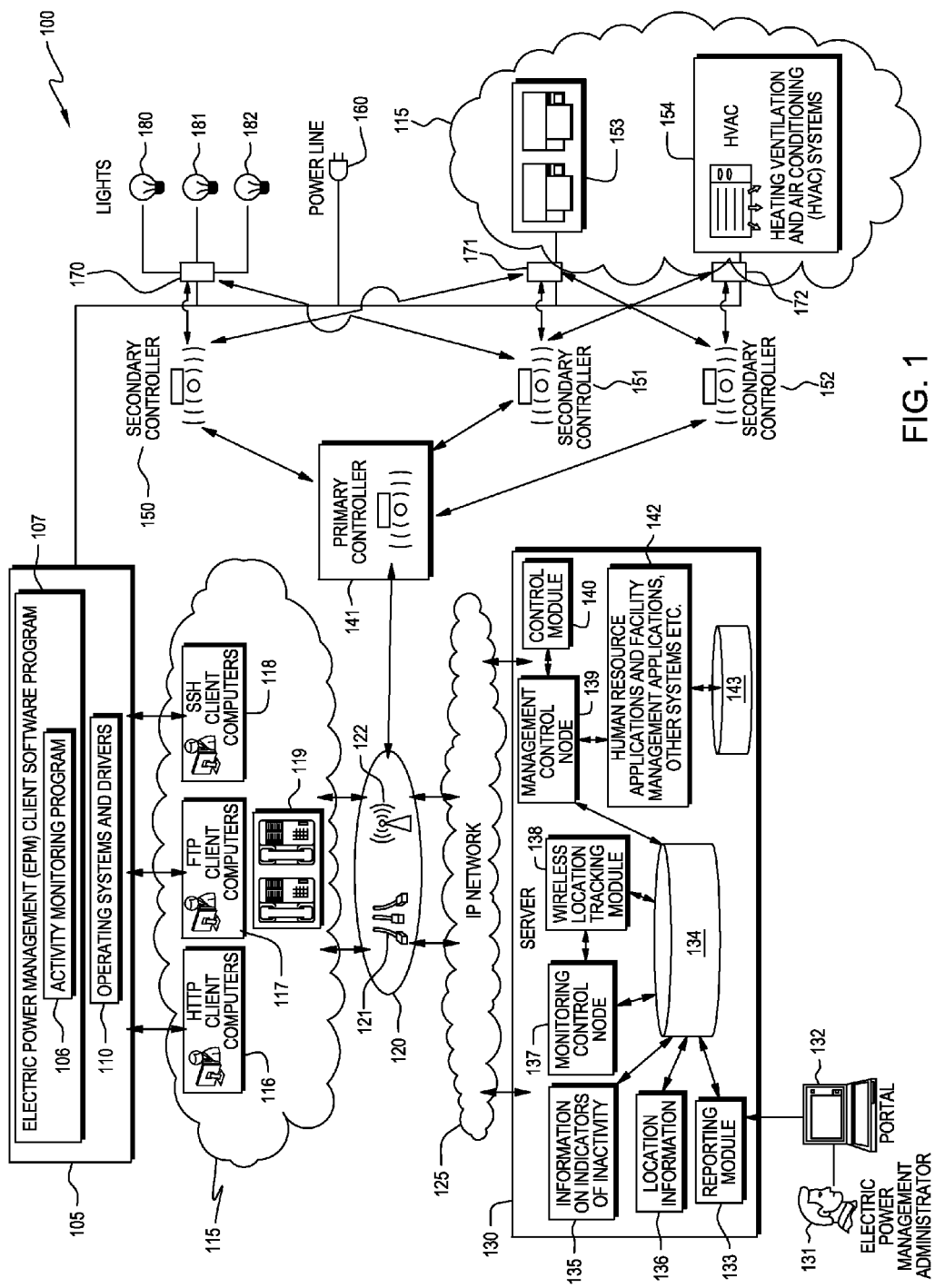
FIG. 1 depicts a high-level architectural view of a networked computing environment that provides a system for controlling and minimizing electrical power consumption of electrical components, which include lights, electronic devices, and heating ventilation and air conditioning (HVAC) systems that are all connected to the networked computing environment according to an embodiment of the present invention.

The drawings are not necessarily to scale. The drawings are merely schematic representations, not intended to portray specific parameters of the invention. The drawings are intended to depict only typical embodiments of the invention, and therefore, should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention are directed to controlling and minimizing the electrical power consumption of lights, electronic devices, and heating ventilation and air conditioning (HVAC) systems connected to a networked computing environment. Under embodiments of the present invention, an electric power management service is provided.

The electric power management service comprises both computer hardware and computer software components to control and minimize the electricity consumed in a building (e.g., manufacturing facility). Specifically, the electric power management service provides the capability to control the electrical power consumption of electrical components in a building connected to a networked computing environment, wherein the electrical components include lights, electronic devices, and HVAC systems.

FIG. 1 illustrates a high-level architectural view of a networked computing environment 100 utilized to provide an electric power management service. Networked computing environment 100 can be implemented for a building including, for example, warehouses, manufacturing facilities, hospitals, and school campus buildings. The purpose of networked computing environment 100 is to provide electric power management service to control and minimize the electrical power consumption of electrical components. The electrical components can include lights 180-182 and electronic devices and systems 115 that are connected to an IP network 125 via access point network connections 120. Electronic devices and systems 115 can include devices with TCP/IP data input and output connectivity, such as the client computers 116-118, phones 119, printers 153, and HVAC systems 154. Moreover, access point network connections 120 comprise wired access point connections 121, and wireless access point (WAP) connections 122. The purpose of IP network 125 is to provide connectivity between electronic devices and systems 115 and electric power management server 130, and to provide connectivity between lights 180-182 and the electric power management server.

Furthermore, networked computing environment 100 comprises electric power consumption management functionality 105 provided by client computers 116-118 and server 130. Client computers 116-118 can include laptops or desktops. Electric power management service may be provided by electric power consumption management functionality 105, which can be tangibly embodied as modules of program code installed on client computers 116-118 and server 130. Thus, electric power consumption management functionality 105 includes one or more program modules such as an electric power management (EPM) client software program code 107. EPM client software program code 107 comprises one or more sub-modules such as computer user activity monitoring program code 106. Activity monitoring program code 106 can monitor computer operating systems and drivers 110 of client computers 116-118 for indicators of inactivity, and generate information on the indicators of inactivity 135. Indicators of inactivity are computer related events that are utilized by EPM client software program code 107 to determine whether or not client computers 116-118 are being utilized. Indicators of inactivity include computer mouse movement, keyboard input (i.e., keyboard strokes), computer microphone usage, webcam usage, phone usage, and printer usage. The generated information on the indicators of inactivity includes timestamp information on the last occurrence of the computer related events.

EPM client software program code 107 is capable of turning on or off client computers 116-118 based on the information generated by computer user activity monitoring program code 106. In addition, EPM client software program code 107 utilizes network protocols to send files over IP network 125 to server 130. The files can include location information 136 and information on indicators of inactivity 135, for lights 180-182 and electronic devices and systems 115. For example, subsequently after lights 180-182 and electronic devices and systems 115 are connected to networked computing environment 100, location information 136 for lights 180-182 and the electronic devices and systems 115 are sent through IP network 125 to be stored on a database 134, wherein the database resides on server 130. Thus, networked computing environment 100 provides support for client computers 116-118 that utilize standards-based network protocols, which include Hypertext Transfer Protocol (HTTP), File Transfer Protocol (FTP), and Secure Shell (SSH) Protocol, respectively.

In addition, activity monitoring program code 106 can run as a background process on client computers 116-118 without affecting normal computing operations on the client computers. Activity monitoring program code 106 can monitor computer operating systems and drivers 110 of client computers 116-118 for indicators of inactivity, and generate information on indicators of inactivity 135. EPM client software program code 107 can utilize the information on indicators of inactivity 135 to determine whether or not one or more electronic devices and systems 115 are being utilized. If one or more electronic devices and systems 115 are not being utilized then EPM client software program code 107 can turn them off.

Electronic devices and systems 115 include devices with TCP/IP data input and output connectivity, such as the client computers 116-118, phones 119, printers 153, and HVAC systems 154. Moreover, the information on indicators of inactivity 135 can be stored on database 134. Information on indicators of inactivity 135 can include computer state information, computer mouse information, keyboard input information, computer microphone information, webcam input information, phone usage information, printer request information, schedule information, and custom option information. Accordingly, generated information on indicators of inactivity 135 can be utilized by EPM client software program code 107 to determine whether to turn on or off client computers 116-118.

Computer state information includes information on whether the computer is in locked mode, standby mode, or sleep mode. Computer mouse information includes timestamp information on the last occurrence of mouse movement. Keyboard input information includes timestamp information on the last occurrence of keyboard input (i.e., keyboard strokes). Computer microphone information includes timestamp information on the last occurrence of noise captured through a computer microphone. Webcam input information includes timestamp information on the last occurrence of motion captured through a webcam. Phone usage information includes timestamp information on the last occurrence of phone usage. Printer request information includes timestamp information on the last occurrence of a print request. Schedule information includes employee work schedules, and computer system maintenance schedules. Custom option information includes information on whether a computer user has selected to override all or part of electric power consumption management functionality 105. For example, a computer user can choose a custom option to prevent EPM client software program code 107 from turning off one or more client computers 116-118, when the computer user is working during non-scheduled hours, or if the computer user wants to leave one or more client computers on, regardless of whether the client computers are not being utilized.

Furthermore, location information 136 identifies where lights 180-182 and electronic devices and systems 115, connected to IP network 125, are located in a building. Specifically, if lights 180-182 and/or electronic devices and systems 115 are connected to IP network 125 via wired access point connections 121, then a monitoring control node 137 can provide location information 136 associated with the lights and/or the electronic devices and systems by querying database 134 on server 130, for the previously stored location information. However, if lights 180-182 and/or electronic devices and systems 115 are connected to IP network 125 via WAP connections 122, then monitoring control node 137 will request a wireless device location tracking module 138 to provide location information 136 associated with the lights and/or the electronic devices and systems that are connected to the IP network via the WAP connections. Wireless device location tracking module 138 can utilize the concept of trilateration or triangulation to provide location information 136, to monitoring control node 137, for lights 180-182 and/or electronic devices and systems 115 that are utilizing WAP connections 122. In addition, electric power consumption management functionality 105 can utilize location information 136, provided by wireless tracking module 138, to request control module 140 to provide unique identifiers associated with a series of secondary controllers 150-152 and switches 170-172. The unique identifiers can be utilized by electric power consumption management functionality 105 to turn on or off lights 180-182 and/or electronic devices and systems 115, based on the information on indicators of inactivity 135.

Information on indicators of inactivity 135 and location information 136, for lights 180-182 and electronic devices and systems 115, can be communicated through wired access point connections 121 over IP network 125 to server 130. Also, indicators of inactivity 135 and location information 136 for lights 180-182 and electronic devices and systems 115, utilizing WAP connections 122, can be communicated through secondary wireless controllers 150-152 and a primary wireless controller 141, through the WAP connections, over IP network 125, to control module 140 on server 130. In the present embodiment, control module 140 is a Zigbee control module, wherein in Zigbee refers to a wireless mesh networking standard for data communication protocol, and wherein the control module adheres to the mesh networking standard. In alternative embodiments, control module 140 may include any other program modules capable of sending and receiving information through IP network 125, to and from at least one primary wireless controller 141 and one or more secondary wireless controllers 150-152.

Also, an electric power management administrator (EPM administrator) 131 can utilize a computer-based portal 132 to access a management control node 139, and through the management control node the EPM administrator can control and minimize electrical consumption of electronic devices and systems 115. For example, EPM administrator 131 can utilize computer-based portal 132 to generate reports through a reporting module 133. The reports can include: the number of computer users that are logged into IP network 125, location information 136 of lights 180-182, location information of electronic devices and systems 115, and schedule information. The schedule information can include work schedule information of employees and computer system maintenance schedules, which can be manually created by EPM administrator 131, via computer-based portal 132, and stored on database 134. Alternatively, schedule information can be imported into database 134, from enterprise applications 142, wherein the enterprise applications include databases 143. Enterprise applications 142 can include human resource system applications and facility management applications. Human resource system applications can provide information on work schedules of employees. Facility management applications can provide a visualization of a building's floor plan and layout, as well as a visualization of assets within the building, wherein some of the assets include electronic devices and systems 115 that are connected to IP network 125 within networked computing environment 100.

In addition, EPM administrator 131, through management control node 139, can configure and manage database 134 and computer software applications on server 130, and monitor and manually override computer programmed system actions. For example, EPM administrator 131 can disregard schedule information and manually turn on or off lights 180-182 and/or electronic devices and systems 115, by accessing management control node 139 via computer-based portal 132. EPM administrator 131 can access management control node 139 via computer-based portal 132 from a local or remote location.

Accordingly, networked computing environment 100 provides electric power management service such that electronic devices and systems 115 can be turned on or off manually by an EPM administrator 131, or turned on or off by EPM client software program code 107 based on indicators of inactivity 135 stored on database 134. Specifically, the lights 180-182, can be turned on or off by utilizing primary wireless controller 141, secondary controllers 150 or 151, and a switch 170. Printers 153 can be turned on or off by utilizing primary wireless controller 141, secondary wireless controllers 150-152, and a switch 171. HVAC systems 154 can be turned on or off by utilizing primary wireless controller 141, secondary controllers 151 or 152, and a switch 172. Accordingly, switches 170, 171, and 172 are installed as intermediaries between a power line 160 and secondary wireless controllers 150-152. If a one or more switches 170-171 fails then a nearby switch (e.g., switch 172) with connectivity to at least one of the one or more secondary controllers 150-152 can still be utilized to turn on or off lights 180-182 and electronic devices and systems 115. Thus, additional switches and wireless controllers may be installed to provide redundancy in order to ensure continued operation of the electric power management service even if certain switches and/or wireless controllers fail.

Power line 160 delivers electricity to lights 180-182 and electronic devices and systems 115, wherein the lights and electronic devices and systems are connected to IP network 125. Switches 170, 171, and 172 control whether the electricity passes to lights 180-182 and electronic devices and systems 115, based on commands that the switches receive from control module 140. The commands are communicated through IP network 125, to primary wireless controller 141 and secondary wireless controllers 150-152. In addition, networked computing environment 100 is scalable and allows for additional electrical components to be added while still being able to control and minimize electrical power consumption.

In one embodiment, primary wireless controller 141 and secondary wireless controllers 150-152 are Zigbee wireless controllers, but in other embodiments the primary wireless controller and the secondary wireless controllers may include other electronic components, with TCP/IP data input and output connectivity, capable of providing location information 136. Location information 136 indicates where lights 180-182 and electronic devices and systems 115 are located in a building, wherein the location information can be communicated over IP network 125 to server 130 to and from control module 140, and wherein the location information is stored on database 134. In one embodiment, control module 140 is a Zigbee control module, but in alternative embodiments the control module may include other program control modules capable of sending and receiving information to and from primary wireless controller 141, and secondary wireless controllers 150-152. Moreover, in one embodiment, switches 170-172 are Zigbee actuators, but in alternative embodiments the switches may include other types of components capable of communicating with wireless controllers 150-152, for purposes of turning on or off lights 180-182 and electronic devices and systems 115.

Figure 2:
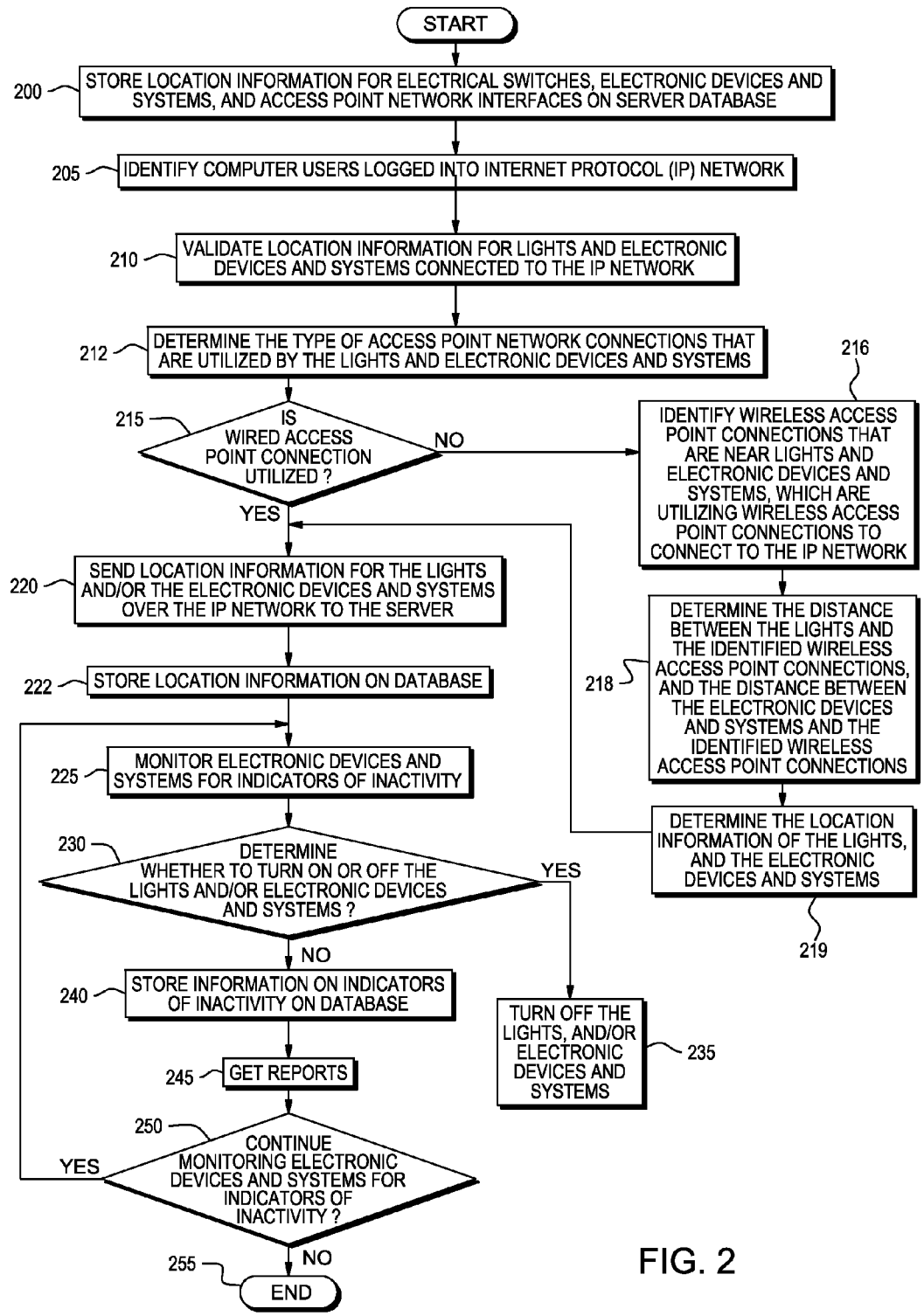
FIG. 2 is a flowchart illustrating a method for controlling and minimizing electrical power consumption of electrical components, which include lights, electronic devices, and HVAC systems that are all connected to a networked computing environment according to an embodiment of the present invention.

FIG. 2 illustrates computer implemented method steps for controlling and minimizing electrical power consumption of electrical components connected to networked computing environment 100. In one embodiment, the following steps which are described with reference to FIG. 2 may be performed by electric power consumption management functionality 105 to control and minimize electrical power consumption of electrical components. Electrical components include lights 180-182 and electronic devices and systems 115 that are connected to IP network 125 via access point network connections 120. As depicted in step 200, location information 136 for switches 170-172, location information for electronic devices and systems 115, and location information for access point network connections 120 are stored on database 134. In step 205, EPM client software program code 107 identifies computers users logged into IP network 125. In step 210, location information 136 for lights 180-182 and electronic devices and systems 115, connected to IP network 125, is validated. In step 212, the type of access point network connections 120 utilized by lights 180-182 and electronic devices and systems 115 are determined, for example, by querying database 134. In step 215, if the type of access point network connections 120 utilized by light 180-182 and electronic devices and systems 115 are wired access point connections 121, then the process proceeds to step 220. In step 220, electric power consumption management functionality 105 sends location information 136 for lights 180-182 and/or electronic devices and systems 115 over IP network 125, to server 130. In step 222, location information 136 is stored on database 134 residing on server 130. In the present embodiment, database 134 resides on server 130, but in alternative embodiments the database may reside on a separate computer or network attached storage device. However, in step 215, if the type of access point network connections 120 utilized by lights 180-182 and electronic devices and systems 115 are WAP connections 122, then process proceeds to step 216, wherein additional process steps are taken prior to performing step 220.

Thus, in step 216, WAP connections 122 that are near lights 180-182 and electronic devices and systems 115 that are utilizing the WAP connections to connect to IP network 125, are identified. Next in step 218, the distances between lights 180-182 and identified WAP connections 122 are determined, and the distances between the electronic devices and systems 115 and the identified WAP connections are determined. In the present embodiment, a wireless device location tracking module 138 determines the distances, and provides the location information 136 associated with the lights 180-182 and/or electronic devices and systems 115 that are connected to IP network 125 via WAP connections 122. Wireless device location tracking module 138 utilizes the concept of trilateration to measure the distances, but in alternative embodiments other concepts may be utilized to measure the distances such as triangulation. Trilateration involves the determination of absolute or relative locations of points by measurement of distances using geometry of spheres, wherein the intersection of the spheres identifies the absolute or relative location of the points. Triangulation is the process of determining the location of a point by measuring angles to the point from known points at either end of a fixed baseline. In step 219, location information 136 of lights 180-182 and electronic devices and systems 115 is determined. In step 220, electric power consumption management functionality 105 sends location information 136 for lights 180-182 and/or electronic devices and systems 115 over IP network 125, to server 130. Then, in step 222, location information 136 is stored on database 134 residing on server 130. After location information 136 is stored on database 134, the process proceeds to step 225.

In step 225, electric power consumption management functionality 105 monitors electronic devices and systems 115 for information on indicators of inactivity 135, which include computer state information (i.e., locked, standby mode, sleep mode), computer mouse information, keyboard input information, webcam input information, phone usage information, printer request information, schedule information, and custom option information. Custom option information indicates whether a computer user has selected a custom option to override electric power consumption management functionality 105. For example, a computer user can choose a custom option to prevent EPM client software program code 107 from turning off one or more client computers 116-118, when the computer user is working during non-schedule hours. In addition, a computer user can override EPM client software program code 107 if the computer user wants to leave one or more client computers 116-118 on, regardless of whether the one or more client computers are not being utilized. The information on indicators of inactivity 135 is stored on database 134, which is utilized by EPM client software program code 107 to determine whether to turn on or off client computers 116-118.

Specifically, EPM client software program code 107 will make the determination to turn off one or more client computers 116-118 based on whether computer related events, which can include mouse movement, keyboard input (i.e., keyboard strokes), computer microphone usage, webcam usage, phone usage, and printer usage, meet, exceed or fall below a configurable associated threshold value. If the threshold value is met or exceeded this indicates one or more client computers 116-118 are being utilized and should not be turned off, but if the threshold value is not met or exceeded this indicates one or more of client computers are not being utilized and should be turned off. Lastly, client computers 116-118 can be turned on based on schedule information and/or selection of a custom option, wherein both the schedule information and the custom option can provide an indication to EPM client software program code 107 to turn on the client computers. Schedule information includes information on scheduled times that client computers 116-118 are generally utilized. A custom option refers to an option that allows a computer user to override EPM client software program code 107, and prevent the program code from turning off one or more client computers 116-118.

In step 230, a determination is made whether to turn on or off lights 180-182 and/or one or more electronic devices and systems 115, based on indicators of inactivity 135 associated with the electronic devices and systems 115. The process proceeds to step 235 if the determination made is to turn off lights 180-182 and/or electronic devices and systems 115. In step 235, electric power consumption management functionality 105 turns off lights 180-182 and/or electronic devices and systems 115. In step 240, indicators of inactivity 135 which includes: the computer state information (i.e., locked, standby mode, sleep mode), computer mouse information, keyboard input information, computer microphone information, webcam input information, phone usage information, printer request information, schedule information, and custom option information are stored on database 134, on server 130. In step 245, EPM administrator 131 can utilize computer-based portal 132 to generate reports from database 134. In step 250, a determination is made whether to continue monitoring, and if the determination made is to continue monitoring the process will proceed back to step 225, wherein electric power consumption management functionality 105 will continue monitoring lights 180-182 and electronic devices and systems 115 for indicators of inactivity 135. Otherwise, the process ends at step 255.

The flowchart diagram, in FIG. 2 illustrates the functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
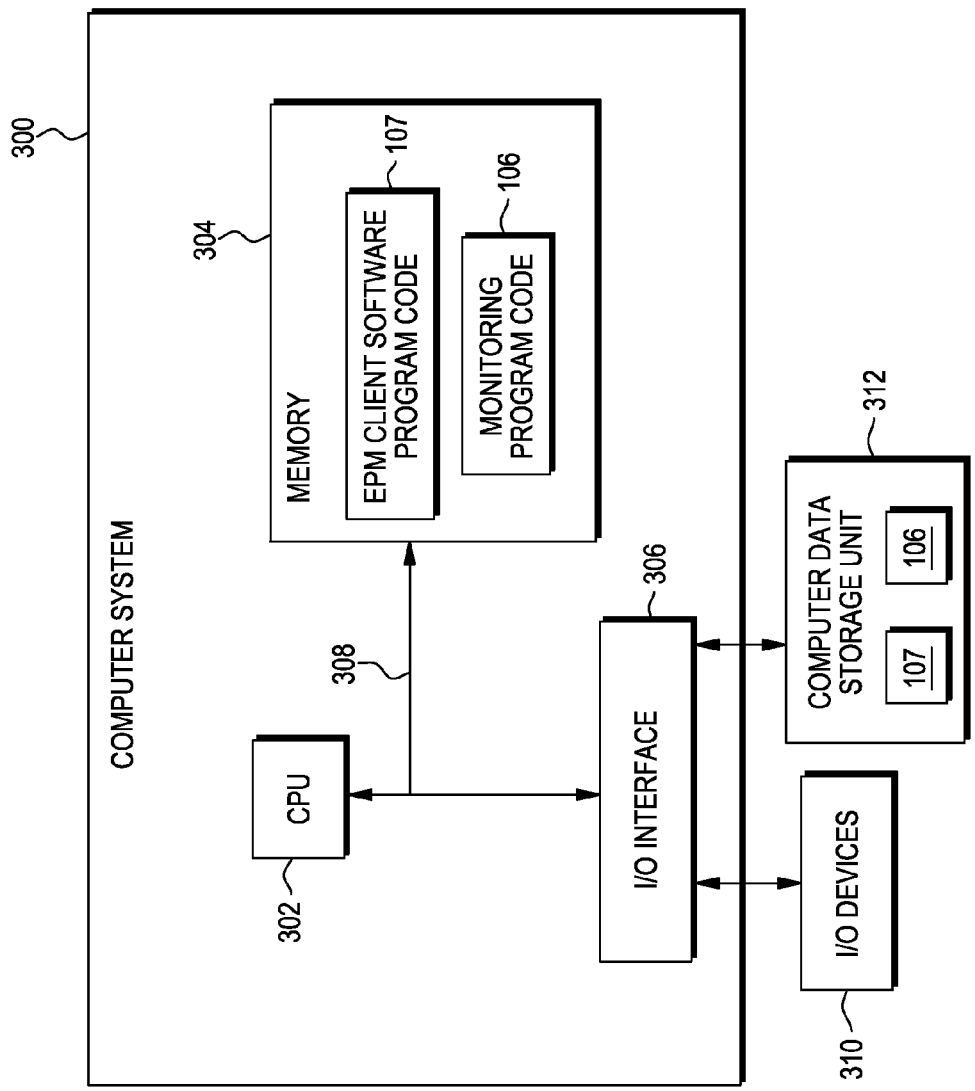
FIG. 3 is a block diagram of a computer system (i.e., computer hardware and computer software) that is included in the networked computing environment of FIG. 1 and that is capable of being utilized to implement the process steps of FIG. 2 according to an embodiment of the present invention.

FIG. 3 is a block diagram of a computer system (i.e., computer hardware and computer software) components that is included in networked computing environment 100 (shown in FIG. 1), and that can implement the processes of FIG. 2, according to an embodiment of the present invention. Computer system 300 generally comprises a central processing unit (CPU) 302, a memory 304, an input/output (I/O) interface 306, and a bus 308. Further, computer system 300 is coupled to I/O devices 310 and a computer data storage unit 312. CPU 302 performs computation and control functions of computer system 300, including carrying out instructions included in EPM client software program code 107 and computer user activity monitoring program code 106 to control and minimize the electrical power consumption of electrical components connected to networked computing environment 100, wherein the instructions are carried out by CPU 302 via memory 304. CPU 302 may comprise a single processing unit, or be distributed across one or more processing units in one or more locations (e.g., on a client and server).

Memory 304 may comprise any known computer-readable storage medium, which is described below. In one embodiment, cache memory elements of memory 304 provide temporary storage of at least some program code (e.g., program code 107 and 106) in order to reduce the number of times code must be retrieved from bulk storage while instructions of the program code are carried out. Moreover, similar to CPU 302, memory 304 may reside at a single physical location, comprising one or more types of data storage, or be distributed across a plurality of physical systems in various forms. Further, memory 304 can include data distributed across, for example, a local area network (LAN) or a wide area network (WAN).

I/O interface 306 comprises any system for exchanging information to or from an external source. I/O devices 310 comprise any known type of external device, including a display device (e.g., monitor), keyboard, mouse, printer, speakers, handheld device, facsimile, microphone, webcam, etc. Bus 308 provides a communication link between each of the components in computer system 300, and may comprise any type of transmission link, including electrical, optical, wireless, etc.

I/O interface 306 also allows computer system 300 to store information (e.g., data or program instructions such as program code 106 and 107) on and retrieve the information from computer data storage unit 312 or another computer data storage unit (not shown). Computer data storage unit 312 may comprise any known computer-readable storage medium, which is described below. For example, computer data storage unit 312 may be a non-volatile data storage device, such as a magnetic disk drive (i.e., hard disk drive) or an optical disc drive (e.g., a CD-ROM drive which receives a CD-ROM disk).

Memory 304 and/or storage unit 312 may store computer program code 106 and 107 that includes instructions that are carried out by CPU 302 via memory 304 to control and minimize the electrical power consumption of electrical components connected to networked computing environment 100. Although FIG. 3 depicts memory 304 as including program code 106 and 107, the present invention contemplates embodiments in which memory 304 does not include all of code 106 and 107 simultaneously, but instead at one time includes only code 106, only code 107, only a portion of code 106 and/or 107, or a combination of code 106 and 107.

Storage unit 312 and/or one or more other computer data storage units (e.g., database 134 shown in FIG. 1) that are directly/indirectly coupled to computer system 300 may store location information 136 (shown in FIG. 1) and information on the indicators of inactivity 135 (show in FIG. 1), which are utilized for controlling and minimizing electrical power consumption of electrical components connected to networked computing environment 100.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 304 and/or computer data storage unit 312) having computer-readable program code (e.g., program code 106 and 107) embodied or stored thereon.

Any combination of one or more computer-readable mediums (e.g., memory 304 and computer data storage unit 312) may be utilized. The computer readable medium may be a computer-readable signal medium or a computer-readable storage medium. In one embodiment the computer-readable storage medium is a computer-readable storage device or computer-readable storage apparatus. A computer-readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be a tangible medium that can contain or store a program (e.g., program 106 and program 107) for use by or in connection with a system, apparatus, or device for carrying out instructions.

A computer readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 106 and 107) embodied on a computer-readable medium may be transmitted using any appropriate medium, including but not limited to wireless, wireline, optical fiber cable, RF, etc., or any suitable combination of the foregoing.

Computer program code (e.g., program code 106 and 107) for carrying out operations for aspects of the present invention may be written in any combination of one or more programming languages, including an object oriented programming language such as Java®, C++ or the like and conventional procedural programming languages, such as the "C" programming language or similar programming languages.

Aspects of the present invention are described herein with reference to a high-level architectural view of networked computing environment 100 (shown in FIG. 1) and a flowchart (shown in FIG. 2) illustrating a method for controlling and minimizing electrical power consumption of electrical components. It will be understood that each block of the flowchart illustrations and/or block diagrams, and combinations of blocks in the flowchart illustrations and/or block diagrams, can be implemented by computer program instructions (e.g., program code 106 or 107). These computer program instructions may be provided to one or more hardware processors (e.g., CPU 302) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 304 or computer data storage unit 312) that can direct a computer (e.g., computer system 300), other programmable data processing apparatus, or other devices to function in a particular manner, such that the instructions (e.g., program 106 and 107) stored in the computer-readable medium produce an article of manufacture including instructions which implement the function/act specified in the flowchart and/or block diagram block or blocks.

The computer program instructions may also be loaded onto a computer (e.g., computer system 300), other programmable data processing apparatus, or other devices to cause a series of operational steps to be performed on the computer, other programmable apparatus, or other devices to produce a computer implemented process such that the instructions (e.g., program 106 and 107) which are carried out on the computer, other programmable apparatus, or other devices provide processes for implementing the functions/acts specified in the flowchart and/or block diagram block or blocks.

While shown and described herein as a solution for minimizing the electrical power consumption of electrical components, which includes lights, electronic devices, and heating ventilation and air conditioning (HVAC) systems connected to a networked computing environment, it is understood that the invention further provides various alternative embodiments. For example, in one embodiment, the invention provides a computer-readable/useable medium that includes computer program code to enable a networked computing environment to provide functionality for controlling and minimizing the electrical power consumption of lights, electronic devices, and heating ventilation and air conditioning (HVAC) systems connected to the networked computing environment as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device.

In another embodiment, the invention provides a method that performs the process of the invention on a subscription, advertising, and/or fee basis. That is, a service provider, such as a Solution Integrator, could offer to provide functionality for controlling and minimizing the electrical power consumption of electrical components, which include lights, electronic devices, and heating ventilation and air conditioning (HVAC) systems connected to a networked computing environment. In this case, the service provider can create, maintain, and support, etc., a networked computing environment 100 that provides a system that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for controlling and minimizing the electrical power consumption of electrical components, which include lights, electronic devices, and heating ventilation and air conditioning (HVAC) systems connected to a networked computing environment. In this case, a networked computing environment 100, can be provided and one or more systems for performing the processes of the invention can be obtained (e.g., created, purchased, used, modified, etc.) and deployed to the networked computing environment. To this extent, the deployment of a system can comprise one or more of: (1) installing program code on a computing device, such as server 130 or client computers 116-118, from a computer-readable medium; (2) adding one or more computing devices to the networked computing environment; and (3) incorporating and/or modifying one or more existing systems of the networked computing environment to enable the networked computing environment to perform the processes of the invention.

As used herein, it is understood that the term "program code" is any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/computer software program, component software or a library of functions, an operating system, a basic device system/driver for a particular computing device, and the like.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for controlling electrical power consumption of electrical components connected to a networked computing environment, the method comprising:
   determining, by one or more processors, location information of electrical components that are connected to a networked computing environment;
   receiving, by one or more processors, computer related events of one or more electrical components that are logged in to and connected to the networked computing environment, wherein the received computer related events include one or more of: sound received through a computer microphone, and motion detected through a webcam;
   determining, by one or more processors, that utilization associated with one of the computer related events of the electrical components that are logged in to and connected to the networked computing environment is less than a corresponding threshold condition of utilization;
   responsive to determining that the utilization associated with the one computer related event of an electrical component that is logged in to and connected to the networked computing environment is less than the corresponding threshold condition of utilization, turning off, by one or more processors, the electrical component; and
   turning off, by one or more processors, one or more of the electrical components based on location information of the one or more electrical components in relation to the one electrical component with utilization associated with the computer related event that is less than the associated threshold condition of utilization.

2. The method of claim 1,
   wherein the one or more electrical components are connected to the networked computing environment through a wired access point or a wireless access point connection; and
   wherein the one or more electrical components include one or more of: lights, laptop computers, desktop computers, phones, printers, and heating ventilation and air conditioning (HVAC) systems.

3. The method of claim 2, wherein location information of the one or more electrical components connected to the networked computing environment is determined
   by trilateration or triangulation for any of the one or more electrical components connected through a wireless access point connection, and/or retrieving a previously stored location for any of the one or more electrical components through a wired access point.

4. The method of claim 1, wherein
   utilization associated with the computer related events includes one or more of: timestamp information of the computer related events, and custom option information.

5. The method of claim 1, wherein the threshold condition of utilization is a configurable threshold condition corresponding to computer related events.

6. A system for controlling electrical power consumption of electrical components connected to a networked computing environment, the system comprising:
   a bus;
   a processor coupled to the bus;
   a memory medium coupled to the bus, the memory medium comprising instructions to:
   determine location information of electrical components that are connected to a networked computing environment;
   receive computer related events of one or more electrical components that are logged in to and connected to the networked computing environment, wherein the received computer related events include one or more of: sound received through a computer microphone, and motion detected through a webcam;
   determine that utilization associated with one of the computer related events of the electrical components that are logged in to and connected to the networked computing environment is less than a corresponding threshold condition of utilization;
   responsive to determining that the utilization associated with the one computer related event of an electrical component that is logged in to and connected to the networked computing environment is less than the corresponding threshold condition of utilization, turn off the electrical components; and
   turn off one or more of the electrical components based on location information of the one or more electrical components in relation to the one electrical component with utilization associated with the computer related event that is less than the associated threshold condition of utilization.

7. The system of claim 6,
   wherein the one or more electrical components are connected to the networked computing environment through a wired access point or a wireless access point connection; and
   wherein the one or more electrical components include one or more of: lights, laptop computers, desktop computers, phones, printers, and heating ventilation and air conditioning (HVAC) systems.

8. The system of claim 7, wherein location information of the one or more electrical components connected to the networked computing environment is determined by trilateration or triangulation for any of the one or more electrical components connected through a wireless access point connection, and/or retrieving a previously stored location for any of the one or more electrical components through a wired access point.

9. The system of claim 6, wherein utilization associated with the computer related events includes one or more of: timestamp information of the computer related events, and custom option information.

10. The system of claim 6, wherein the threshold condition of utilization is a configurable threshold condition corresponding to computer related events.

11. A computer program product for controlling electrical power consumption of electrical components connected to a networked computing environment, the computer program product comprising:
   one or more hardware storage device and program instructions stored on the one or more hardware storage device, to:
   determine, by one or more processors, location information of electrical components that are connected to a networked computing environment;
   receive computer related events of one or more electrical components that are logged in to and connected to the networked computing environment, wherein the received computer related events include one or more of: sound received through a computer microphone, and motion detected through a webcam;
   determine that utilization associated with one of the computer related events of the electrical components that are logged in to and connected to the networked computing environment is less than a corresponding threshold condition of utilization;
   responsive to determining that the utilization associated with the one computer related event of an electrical component that is logged in to and connected to the networked computing environment is less than the corresponding threshold condition of utilization, turn off the electrical components; and
   turn off one or more of the electrical components based on location information of the one or more electrical components in relation to the one electrical component with utilization associated with the computer related event that is less than the associated threshold condition of utilization.

12. The computer program product of claim 11,
   wherein the one or more electrical components are connected to the networked computing environment through a wired access point or a wireless access point connection; and
   wherein the one or more electrical components include one or more of: lights, laptop computers, desktop computers, phones, printers, and heating ventilation and air conditioning (HVAC) systems.

13. The computer program product of claim 12, wherein location information of the one or more electrical components connected to the networked computing environment is determined
   by trilateration or triangulation for any of the one or more electrical components connected through a wireless access point connection, and/or retrieving a previously stored location for any of the one or more electrical components through a wired access point.

14. The computer program product of claim 11, wherein utilization associated with the computer related events includes one or more of: timestamp information of the computer related events, and custom option information.

15. The computer program product of claim 11, wherein the threshold condition of utilization is a configurable threshold condition corresponding to computer related events.

* * * * *